A United States Patent [19]

Commanday et al.

[11] 3,711,909
[45] Jan. 23, 1973

[54] TIRE RASP
[75] Inventors: Maurice R. Commanday, Palos Verdes Estates; Eugene V. Clark, Northridge; Gregor Baladjanian, Woodland Hills, all of Calif.
[73] Assignee: Chromalloy American Corporation, New York, N.Y.
[22] Filed: Dec. 14, 1970
[21] Appl. No.: 97,612

[52] U.S. Cl. .................................29/79 R, 29/95 R
[51] Int. Cl. .................................................B26d 1/00
[58] Field of Search ..........29/95, 95.3, 78, 79; 76/24

[56] References Cited

UNITED STATES PATENTS 2,842,833   7/1958   Glodde..............................29/79
1,493,191   5/1924   Golyer............................29/95.3 X
31,331      2/1861   Sheehan............................29/78 X
1,740,009   12/1929  Diener............................29/95.3 X
2,371,600   3/1945   Bartholomew......................29/95.3 X
2,309,371   1/1943   Wissler............................29/95 X Primary Examiner—Harrison L. Hinson
Attorney—White, Haefliger & Bachand

[57] ABSTRACT

The wear life of a tire rasp of the type comprising a rotor carrying steel teeth segments operable to abrade and reduce a tire tread applied thereto, is multiplied by the diffusion of boron within surface depths of the segments imparting to their teeth surprising wear and abrasion resistance.

6 Claims, 3 Drawing Figures

PATENTED JAN 23 1973　　　　　　　　　　　3,711,909
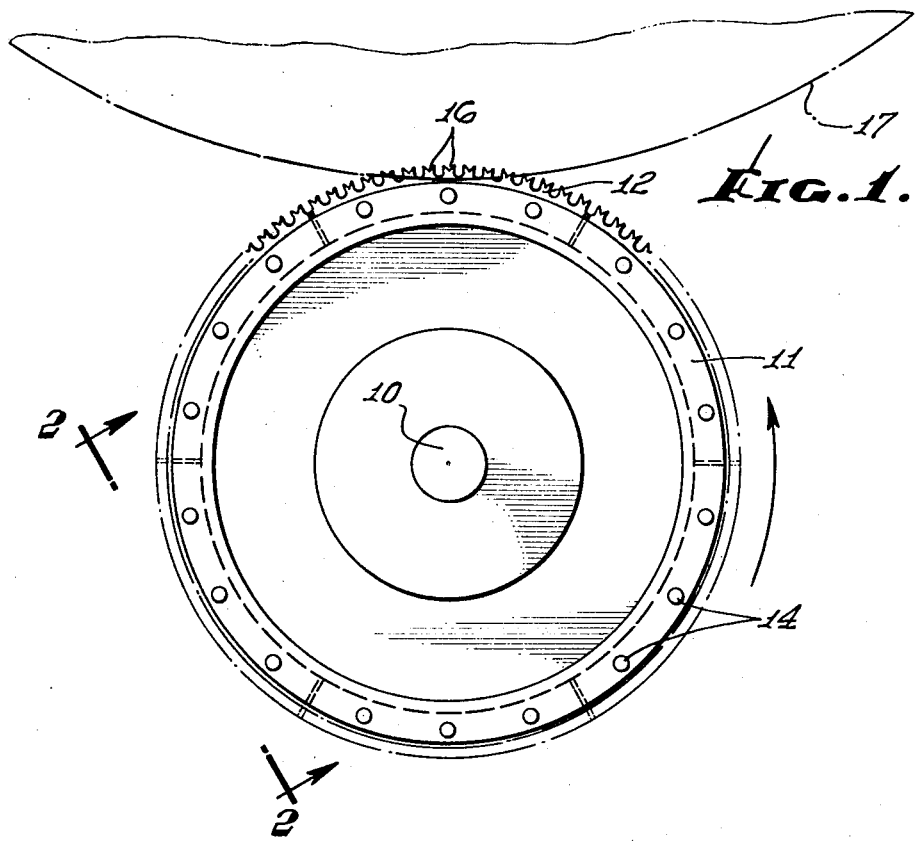
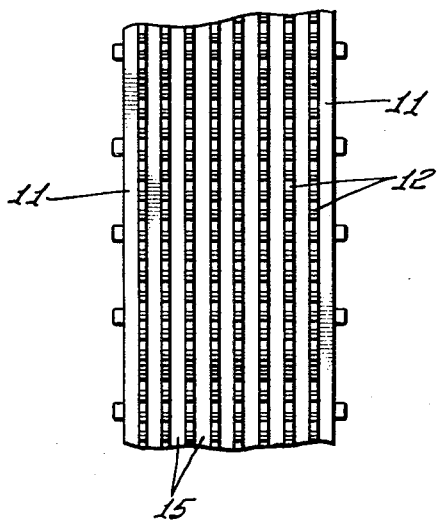
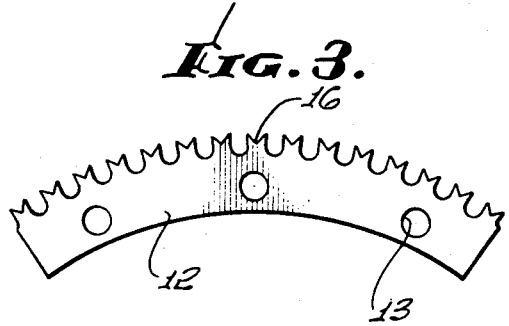
INVENTORS.
MAURICE R. COMMANDAY
EUGENE V. CLARK
GREGOR BALADJANIAN
By White, Haefliger & Bachand
ATTORNEYS.

TIRE RASP

BACKGROUND OF THE INVENTION

In the preparation of tires for retreading it is customary to remove worn treads by the use of rotary rasps consisting of a rotor carrying arcuate carbon steel toothed segments which abrade away the tire tread pressed against them. Service useage produces wear that may require replacement of the segments at considerable expense that could be avoided or significantly reduced by prolonging the wear life of the segment teeth.

SUMMARY OF THE INVENTION

The present invention is predicated upon the discovery that the rasp wear life may be greatly extended by as much as five times normal according to tests, by the diffusion of boron into the segment teeth. Boron diffusion is to be distinguished from superficial or plating techniques, in that as a consequence of diffusion treatment boron is caused to penetrate the segments to variably controllable depths and form boride complexes with the carbon steel that impart to it hardness and toughness that result in surprising wear resistance.

Accordingly, our general object is to so condition the rasp teeth, for which purpose we may employ any of various diffusion procedures as will appear.

Most practicably we contemplate boron diffusion into all surfaces of the segments followed by their heat treatment, quenching and drawing to supplement and best achieve the benefits of the boronizing.

The invention will be more fully explained in the description to follow wherein reference is made to the accompanying drawing.

BRIEF DESCRIPTION OF THE DRAWINGS

FIG. 1 is a view illustrating in side elevation a conventional tire rasp configuration and its application to a tire as illustrated by the broken lines;

FIG. 2 is a fragmentary showing of the toothed face of the rasp; and

FIG. 3 is an enlarged showing of one of the rasp segments.

DESCRIPTION OF THE PREFERRED EMBODIMENTS

FIG. 1 is intended to illustrate physically a known rotary tire rasp configuration in which the body of the rasp accommodated for rotation as about shaft 10, includes end plates or discs 11 confining between them arcuate rasp segments 12 having openings 13 for the reception of retainer pins 14. Provision is made for laterally spacing apart the segment series as at 15. Each of the segments 12 has an arcuate series of teeth 16 which when the rasp is rotatably driven, engage and abrade away to desired depth the tread of a tire 17 applied to the rotor periphery.

In keeping with the general object and purposes of the invention we are able to extend the useful wear life of the segments 12, and particularly the teeth series 16, by diffusion of boron within surface depths of the segments to impart to their teeth what tests have shown to be surprising wear and abrasion resistance. For this purpose we employ special diffusion coating processes which produce in the toothed segments a layer of boron carbide and iron borides for a depth of 0.0001 to 0.010 inch or more, the surface hardness of the coating being in the order of about 2,000 Knoop. Generally employed is boron diffusion into the carbon steel segments 12 followed by conventional heat treating, quenching and drawing which harden and toughen the steel to a degree adequate to resist the impact and bending loads imposed in service.

Diffusion coating of the segments may be achieved by any of a number of different treatments. Essentially the segments are subjected to high temperature treatment in exposure to an environment from which boron reacts with the steel to form boron carbide and iron borides which, when maintained at the treatment temperature for adequate time periods, diffuse into the steel to form the hard protective surface layer to the depths indicated.

As illustrative of useable diffusion treatments, the rasp segments may be packed in amorphous elemental boron and furnace heated to about 1,800°F for a period of one-half to 4 hours, no activator or air being present in the pack.

Alternatively the segments may be packed in amorphous boron, 0.2 to 15 percent, aluminum oxide, 9.8 to 85 percent, with halide activator, about 0.05 to 1 percent, and heated at 1,400° to 1,900°F for from 4 to 10 hours, depending upon the desired depth of boron diffusion. Such pack diffusion processes employing halide activators are known in techniques for diffusion of e.g., chromium, alone or with other metals, into metallic substrates.

A third method of boronizing the parts is to immerse the segments in a fused borax bath ($NaB_4O_7 \cdot 10H_2O$) at 1,700°F, the immersed parts forming the cell cathode, typical treating time being about three hours at current density of 0.1 Amp/CM².

The boron diffusion may be accomplished in a gaseous atmosphere by suspending the segments in a chamber wherein they are resistance or induction heated to about 1,650°F. A mixture of $BCl_3$ and $H_2$ is introduced to the chamber, and the $BCl_3$ is reduced with the production of HCl. This reduction takes place on the surface of the heated part, and forms a boron coating. At this temperature the mobilities of the boron atoms and those of the substrate are such as to cause interdiffusion at an appreciable rate. Control of the substrate temperature and the rate of gas flow determines concentration gradients, rates of deposition, and limiting deposition or diffusion. This is a typical process, and not limited to $BCl_3$ - $H_2$. Other halides can be used, as can single component systems (organo-boron).

We claim:

1. A tire rasp comprising a rotor peripherally carrying steel teeth operable to abrade and reduce a tire tread said teeth being formed of steel and having a diffusion coating thereon comprising boron carbides and iron borides to provide a hard protective surface layer to a depth between 0.0001 and 0.010 inch.

2. A tire rasp according to claim 1, in which said teeth are formed on arcuate steel segments spaced axially of the rotor.

3. A tire rasp according to claim 2 in which all surfaces of the segments are diffusion coated to contain boron carbides and iron borides to a depth of about 0.0001 to 0.010 inch.

4. The method of increasing the wear life of preformed steel tire rasp teeth segments that includes diffusion coating boron into surface depths of the teeth.

5. The method of claim 4 in which the boron is diffused into all surfaces of the segments to depths of about 0.001 to 0.001 inch.

6. The method of claim 5, including the further steps of subjecting the boronized segments to heat treating, quenching and drawing to harden and toughen the steel.

* * * * *